United States Patent [19]
Gasper

[11] Patent Number: 5,884,967
[45] Date of Patent: Mar. 23, 1999

[54] CHILD VEHICLE SAFETY SEAT

[76] Inventor: Ronald Gasper, Unit PH 12, 3100 N.E. 48th St., Ft. Lauderdale, Fla. 33308

[21] Appl. No.: 842,817

[22] Filed: Apr. 17, 1997

[51] Int. Cl.⁶ ........................................................ B60N 2/28
[52] U.S. Cl. .............. 297/216.11; 297/253; 297/256.16; 297/273
[58] Field of Search ................................. 297/250.1, 253, 297/254, 256.1, 256.13, 256.16, 281, 273, 277, 278, 216.11

[56] References Cited

U.S. PATENT DOCUMENTS

| | | | |
|---|---|---|---|
| 731,197 | 6/1903 | Marqua | 297/281 X |
| 2,605,811 | 8/1952 | Zoranovich . | |
| 2,664,140 | 12/1953 | Kindelberger | 297/216.11 X |
| 3,111,342 | 11/1963 | De Vos | 297/216.11 |
| 3,262,736 | 7/1966 | Merelis . | |
| 3,572,827 | 3/1971 | Merelis | 297/256.13 X |
| 3,645,548 | 2/1972 | Briner | 297/254 X |
| 4,195,708 | 4/1980 | Cannon | 297/277 X |
| 4,215,900 | 8/1980 | Coult | 297/116.11 X |
| 4,221,429 | 9/1980 | Wade | 297/277 |
| 4,412,595 | 11/1983 | Kinzel | 297/277 X |
| 4,591,208 | 5/1986 | McDonald et al. | 297/216.11 X |
| 4,596,420 | 6/1986 | Vaidya | 297/254 X |
| 4,615,560 | 10/1986 | Schaller | 297/254 X |
| 4,911,426 | 3/1990 | Scales | 297/278 X |
| 4,971,392 | 11/1990 | Young | 297/256.13 X |
| 5,487,588 | 1/1996 | Burleigh et al. . | |
| 5,496,083 | 3/1996 | Shouse, Jr. . | |
| 5,527,094 | 6/1996 | Hiramatsu et al. | 297/250.1 |
| 5,562,548 | 10/1996 | Pinch et al. . | |
| 5,564,987 | 10/1996 | Ayrolles | 297/281 X |
| 5,611,596 | 3/1997 | Barley et al. | 297/256.13 |

FOREIGN PATENT DOCUMENTS

| | | | |
|---|---|---|---|
| 13403 | 2/1929 | Australia | 297/253 |
| 1012049 | 6/1977 | Canada | 297/216.11 |
| 2596338 | 10/1987 | France | 297/216.11 |

*Primary Examiner*—Peter M. Cuomo
*Assistant Examiner*—David E. Allred
*Attorney, Agent, or Firm*—Larson & Taylor

[57] ABSTRACT

A child vehicle safety seat includes a frame securable to a vehicle seat such that a child seat mounted thereon is freely pivotable with respect to the frame to reduce the chances of head, neck and compression injuries normally experienced when the vehicle experiences a rapid deceleration or an abrupt stop. The child seat includes a mechanism for adjustment of sensitivity such that the child seat may act like a swing to provide a gentle rocking motion during normal movement of the vehicle or pivot only upon rapid deceleration of the vehicle. The frame is securely fastened to the vehicle seat via the vehicle seat belt and hooks which attach to the backrest and seat cushion of the vehicle seat. Locking devices eliminate slack in the vehicle seat belt to reduce movement of the frame with respect to the vehicle seat.

14 Claims, 8 Drawing Sheets

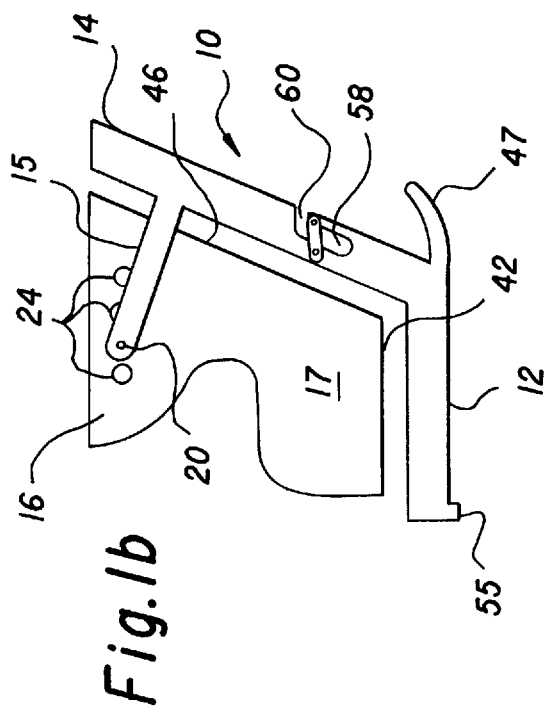
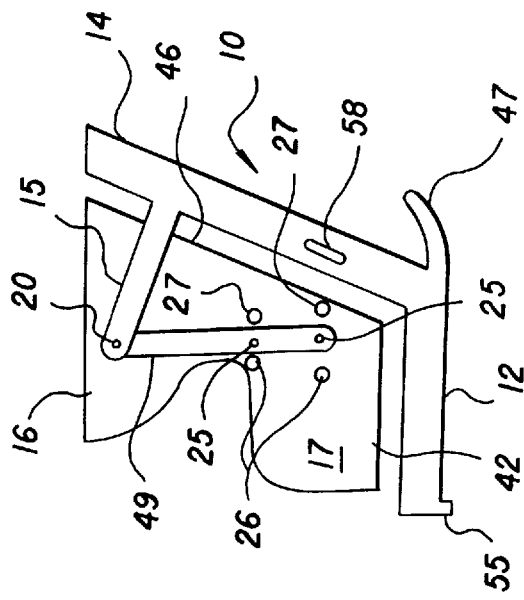
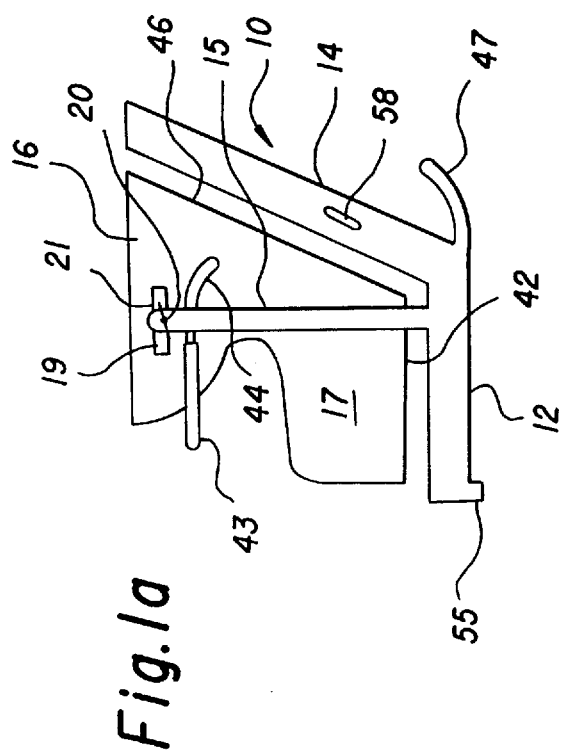
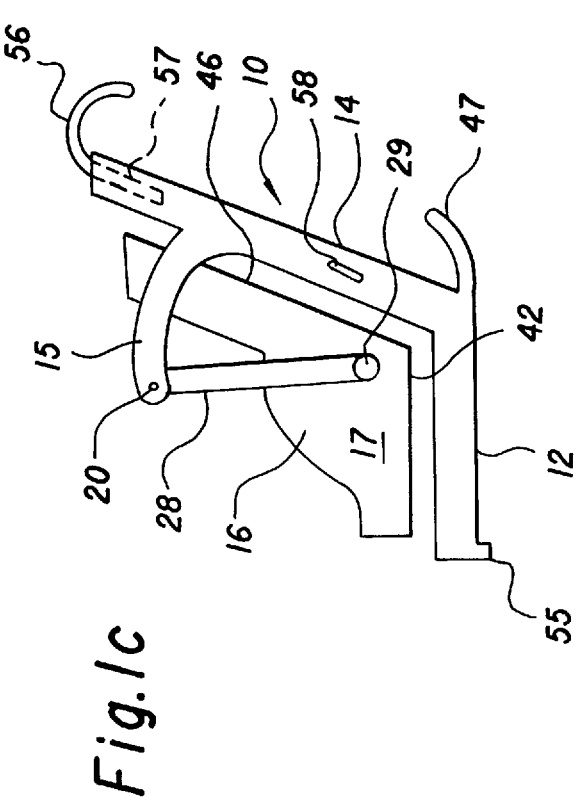

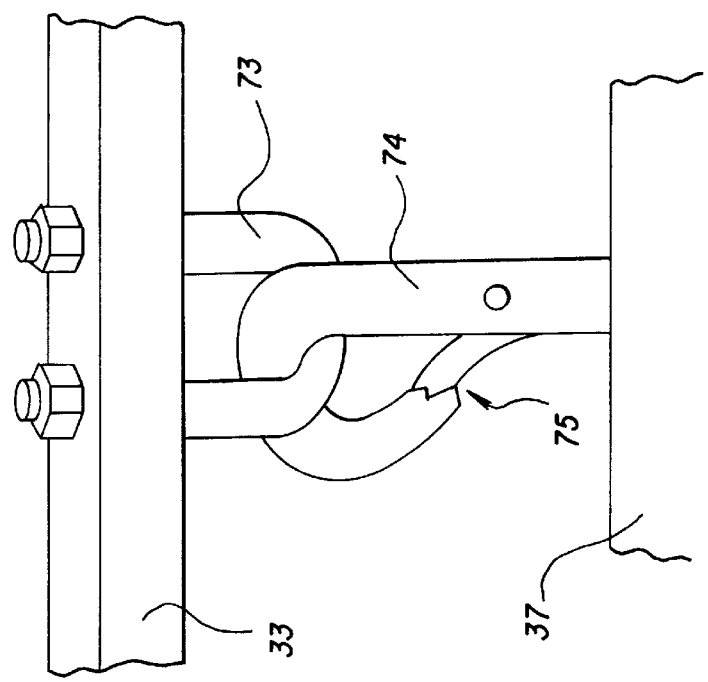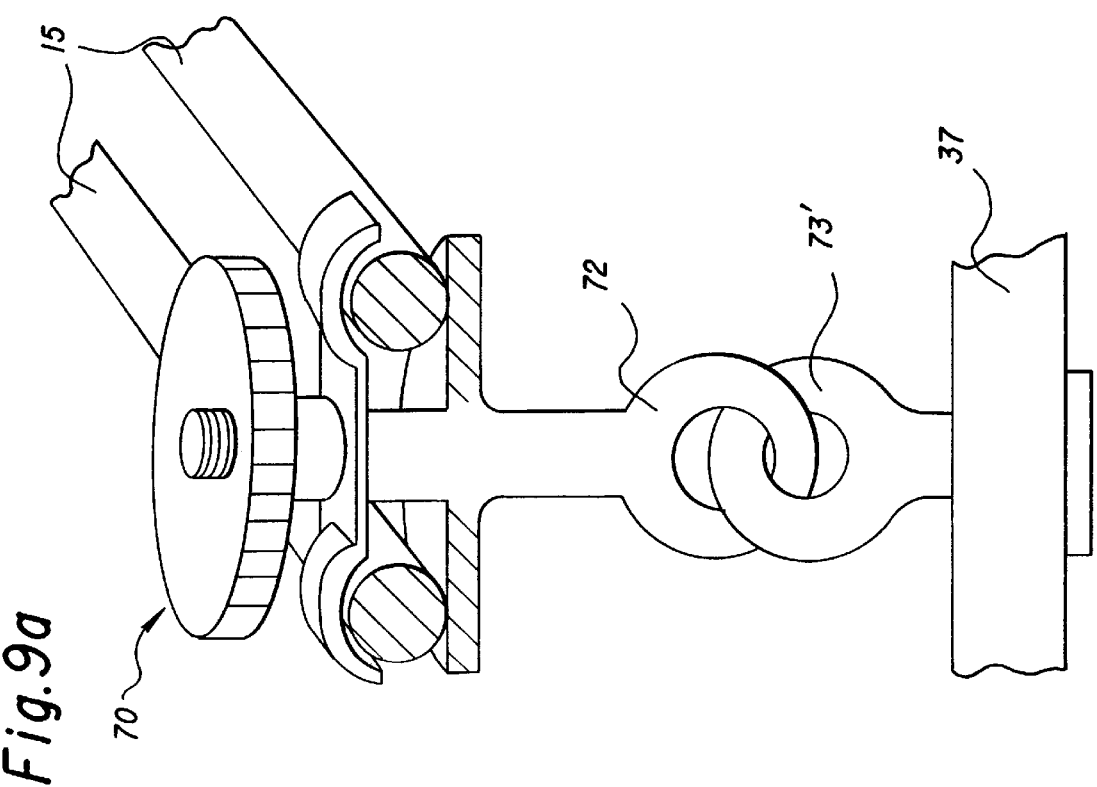

CHILD VEHICLE SAFETY SEAT

FIELD OF THE INVENTION

The present invention is directed to a child vehicle safety seat and, more particularly, to a child vehicle safety seat in which the seat portion pivots in response to extreme deceleration or impact to the vehicle to reduce the possibility of head, neck, and external and internal compression injuries to a child occupant.

BACKGROUND OF THE INVENTION

The use of child vehicle safety seats is now required by law in most states. Conventional child vehicle safety seats have proven highly effective in reducing injuries to children when used properly. Unfortunately, research has shown that the design of most child vehicle safety seats available in the marketplace is such that many parents find installation in the vehicle to be quite complicated. Child vehicle seats are, therefore, often improperly installed, such that the seat provides no added protection for the child and may actually intensify potential injury to the child in the event of an accident.

There are a number of drawbacks associated with conventional child vehicle safety seats. For example, conventional child vehicle safety seats are designed to remain in one fixed position on the vehicle seat. The child seat restraining devices prevent essentially all movement of the child's upper torso. Depending on the degree of deceleration, these restraining devices apply proportional resistance pressures to the very child they are trying to protect and, as a result, may cause not only surface contusions but also serious internal injury.

Even more serious than these compression injuries is the injury potential caused by a sudden snapping forward of the child's head and any portions of the body extending above the location of the restraining devices, such as a lap strap, being employed.

Another drawback of conventional child vehicle safety seats is that they are typically most effective when they are placed in the back seat of the vehicle such that the child faces the rear of the vehicle. However, when the child is placed in this fashion, the driver is unable to view the child and, consequently, may be inclined to repeatedly glance backward, thereby taking his eyes off the road and creating the potential for an accident. Further, older children typically prefer facing forward when seated in a vehicle. Although head straps could be used to reduce whiplash when the child is placed in a forward seated position, this would simply not be an acceptable solution to either the child or a majority of parents.

Placing a child in a conventional child car seat in the front seat of a vehicle also poses an additional hazard where the vehicle is equipped with an airbag, as are most of today's vehicles. In particular, studies have shown that airbag deployment can actually cause head and neck injuries to children and even death.

Another drawback of most conventional one piece child vehicle safety seat designs is that the only manner of securing them to the vehicle seat is by threading the auto seat belts through tunnel-like openings which tend to be obscure and make proper placement very difficult.

Most vehicle safety belts are designed to provide a considerable amount of slack upon impact or rapid deceleration. They cannot truly hold a child vehicle safety seat firmly in place against the vehicle seat.

There is, therefore, a need for a child vehicle safety seat which is easily installed and allows the child to be placed in a forward seated position with less risk of injury.

SUMMARY OF THE INVENTION

Thus, it is a purpose of the present invention to overcome the disadvantages of the prior art and thereby provide a child safety seat for use in a vehicle which reduces the undesired pressures exerted on a child seated therein and resultant injuries which occur when the vehicle experiences rapid deceleration or an abrupt stop.

In accordance with a preferred embodiment of the invention, the child vehicle safety seat includes a frame securable to a vehicle seat. The frame is designed for mounting a child seat such that the child seat is freely pivotable with respect to the frame. Preferably, the frame includes a base portion positionable on a seat cushion of the vehicle seat and an upright portion for resting against a backrest of the vehicle seat. At least one support arm extends outward from the base portion or the upright portion. Means for pivotally mounting the child seat on the frame is attached to the support arm.

Preferably, the child seat includes multiple apertures or slots in the side walls to which the mounting means is attachable, thereby allowing for adjustment in the angle of the child seat with respect to the frame. In addition, the mounting means, and thus the child seat, may be fastenable at varying positions along a length of the support arm.

The mounting means may allow pivoting of the child seat in only a forward and backward direction or it may also allow pivoting in a full range. The child vehicle safety seat also includes means for limiting the degree of pivot in any direction.

To secure the child vehicle safety seat of the invention to the vehicle seat, the frame is equipped with a reversible projection extending rearwardly from a lower end thereof and insertable between the backrest and the seat cushion of the vehicle seat. Not all vehicles have the same seat configuration. Thus, the reversibility feature allows for placement of the insert so as to grip the seat cushion or the backrest of the vehicle seat depending upon which configuration provides the greatest stability in a given vehicle seat configuration. The reversible projection also provides support to the frame when the child vehicle safety seat is removed from the vehicle and placed in a free standing manner for use as a swing.

It is, therefore, an object of the present invention to provide a child vehicle safety seat which is easily installed in a vehicle with minimal chance of improper installation.

It is another object of the present invention to provide a child vehicle safety seat in which a child can safely be placed in a forward seated direction.

It is still another object of the present invention to provide a child vehicle safety seat which can be used to provide a gentle rocking motion to the child under normal driving conditions and also upon removal from a vehicle and placement on a flat surface.

These and other objects of the present invention will become apparent from the detailed description to follow.

BRIEF DESCRIPTION OF THE DRAWINGS

There follows a detailed description of the preferred embodiments of the present invention which are to be en together with the accompanying drawings, wherein.

FIGS. 1a–f are side views of various embodiments of the child vehicle safety seat of the invention;

FIGS. 9a–e show various attachment mechanisms for attaching the child seat to the frame.

DETAILED DESCRIPTION OF THE PREFERRED EMBODIMENTS

Figure 1F:
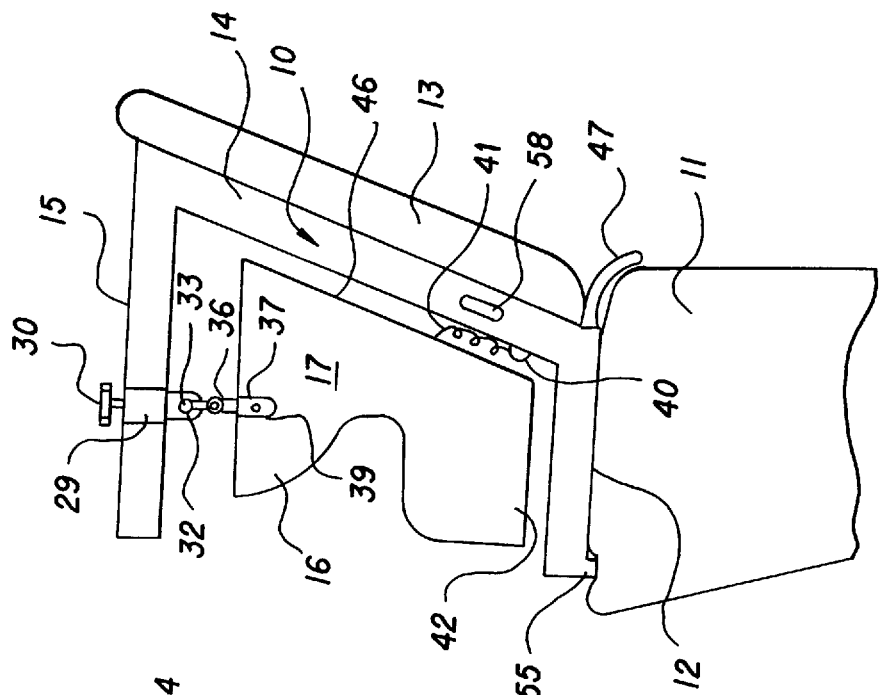

Referring now to the figures, like elements are represented by like numerals throughout the several views. Features shown and described below in connection with any of the figures may be combined, interchanged or modified in the various embodiments of the child vehicle safety seat of the invention.

In general, the child vehicle safety seat of the invention as shown in FIGS. 1a–f includes a frame 10 having a base portion 12 positionable on a seat cushion of a vehicle seat. The frame 10 also includes an upright portion 14 for resting against the backrest 13 of a vehicle seat. The upright portion 14 and base portion 12 may include an adjustment mechanism (not shown) such as a lockable hinge for adjusting the angle between them to better conform to the angle of the vehicle backrest 13 and seat cushion 11. The frame 10 further includes at least one support arm 15 which extends outward from either the base portion 12 (see FIG. 1a) or the upright portion 14 (see FIGS. 1b–f). The frame may be constructed of metal, plastic, wood or any other suitable material or combination of materials.

The child seat 16 is attached to the support arm 15 via mounting means which allows the child seat 16 to be freely pivotable with respect to the frame 10. When the vehicle is subjected to rapid deceleration or an abrupt stop, the child seat 16 pivots forward such that the child's head remains supported, thereby reducing the chance of head and neck injury to the child occupant. The chances of chest and internal compression injuries are also greatly minimized due to the fact that impact forces are redirected to the rear of the child's body--an effect comparable to that of placing a conventional child safety seat on the rear seat so that the child is facing backward.

Preferably, the child seat 16 is attached to the support arm 15 at opposite side walls 17, 18, although the child seat 16 could feasibly be attached to the upright portion 14 at the top edge of the back 46 of the child seat 16.

Figures 2A, 2C:
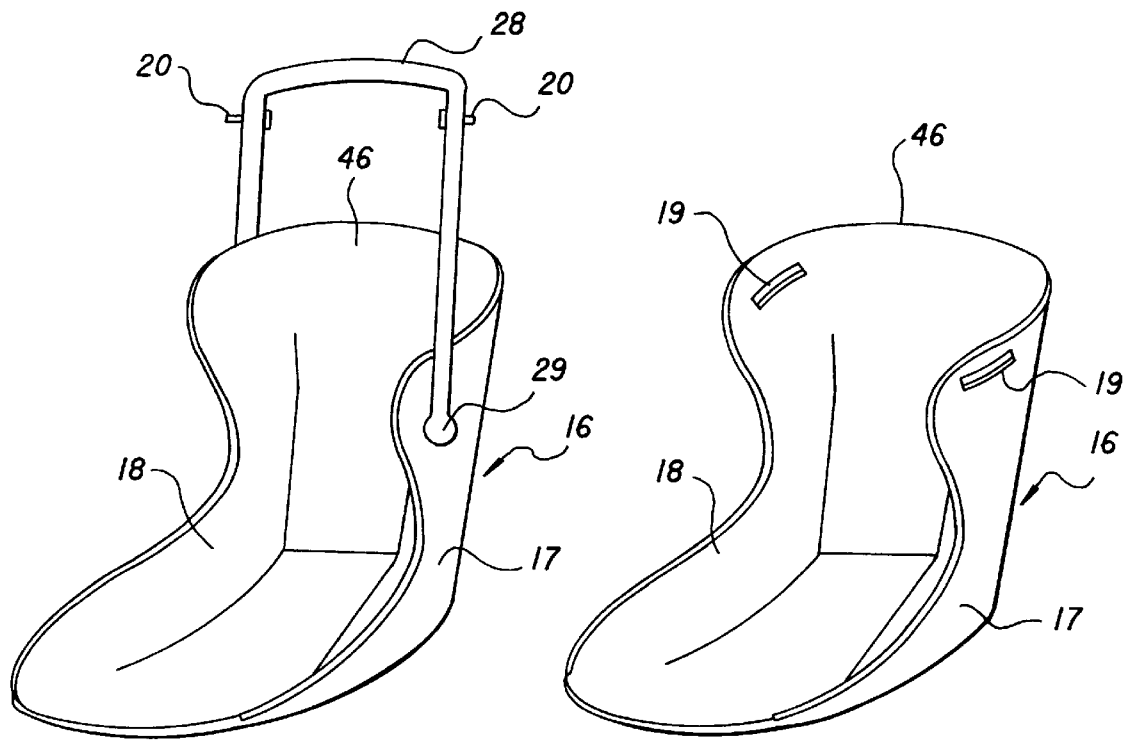
FIGS. 2a–d are front perspective views of alternative configurations for a child seat used in the child vehicle safety seat of the invention.
Figure 9C:
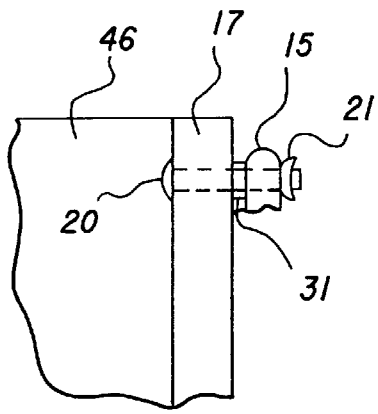

To minimize the risk of the head and neck injuries to a child occupant, the child seat 16 should be secured to the support arm 15 such that the pivot point is located above the child's head when the child is seated. To accommodate children of different heights, the support arm may be vertically adjustable. It is also desirable that the child seat 16 include means for adjusting the balance, or angle of the child seat 16 with respect to the frame 10, since each child has a different physical make-up and weight distribution. In FIGS. 1a and 2c, for example, the child seat 16 includes an elongated slot 19 in each of the opposite side walls 17, 18. The frame 10 includes two support arms 15 positioned parallel to one another. Pins 20, shown in greater detail in FIG. 9c, extend through each of the arms 15 and corresponding adjacent slot 19. The pins 20 may be positioned at any point along the slots 19 and tightened by a wing nut 21 or the like. A spacer 31, such as a conventional washer, may also be positioned between the support arm 15 and side walls 17, 18 of the child seat 16 to improve the ease of pivoting of the child seat 16 with respect to the frame 10.

Figures 2B, 2D:
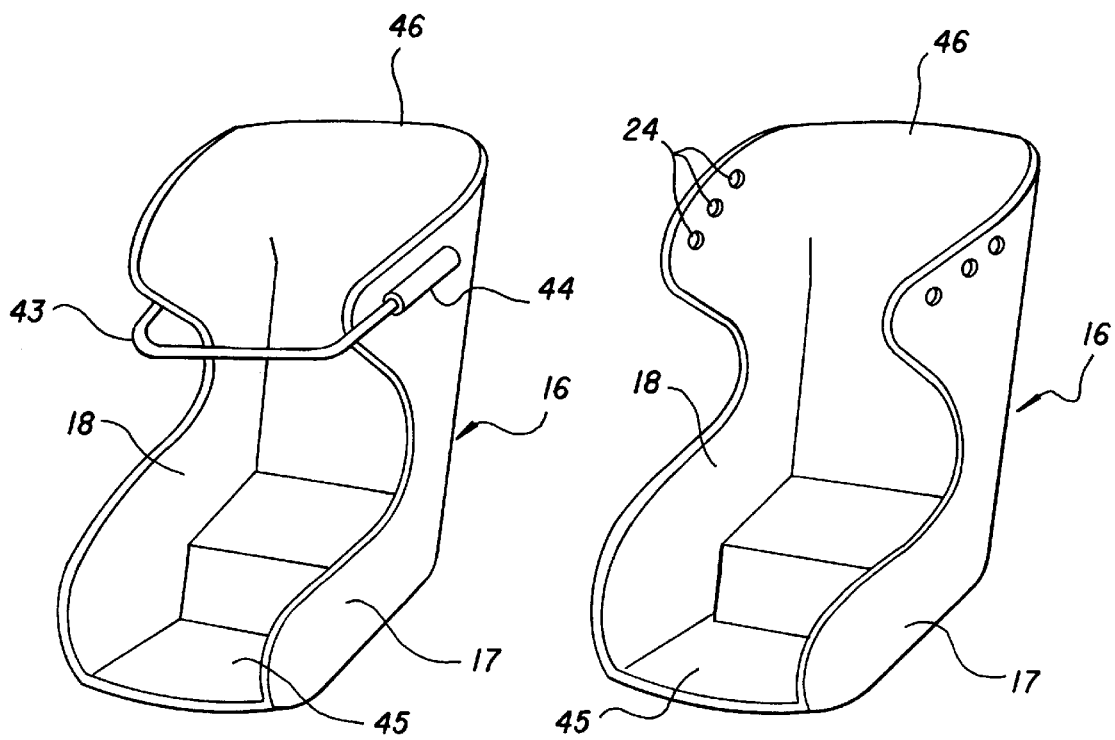

As an alternative to the configuration shown in FIGS. 1a and 2c, the child seat 16 may include multiple cylindrical apertures 24 through which pin 20 may be positioned as shown in FIGS. 1b and 2d. Still another alternative configuration for mounting the child seat 16 is shown in FIG. 1d. In this embodiment, child seat 16 rotates about pin 20. However, angle of the child seat 16 is adjusted via an extension 49 which may be rotated with respect to pin 20 and locked in place on child seat 16 via one or more pins which are securable in one or more rows of apertures 26, 27 (or slots). Regardless of whether elongated slots 19 (FIG. 2c) or cylindrical apertures 24 (FIG. 2d) are utilized, they are typically positioned such that the child's back is most upright when the pivot pin is located toward the rear of the child seat and more horizontal when the pivot pin is located toward the front of the child seat.

The use of an extension arm 28 may also be necessary where the child seat 16 does not have deep side walls, as shown in FIGS. 1c and 2a, for effecting the proper balancing of the child seat 16. In FIGS. 1c and 2a, extension 28 is fixed to child seat 16 at attachment points 29 such that the child seat 16 only pivots about pins 20, i.e., about a point located above the child's head. Extension arm 28 may also be used to carry a child in the child seat 16 after removal from a vehicle.

If the parent wishes to utilize the child seat 16 to provide a continued rocking motion during normal movement of the vehicle, then it is also desirable to locate the child seat 16 at a distance from the upright portion 14 of the frame 10. Thus, the mounting means preferably includes one or more clamps 29 which may be secured at various positions along the support arm(s) 15 via a securing screw 30 or the like (shown in FIGS. 1e and f, 7, and 9d). Alternative clamp and securing screw combinations 70, 71 are shown in FIGS. 9a and b, respectively, discussed in greater detail below.

When the child seat 16 is mounted such that the back 46 is positioned farthest from the vehicle seat back 13, the child seat 16 is most sensitive, i.e., tends to rock or swing during normal braking of the vehicle in which it is mounted. This is particularly useful for an infant as the rocking motion tends to pacify the child. When the child seat 16 is positioned closest to the seat back 13, the child seat 16 is in its position of least sensitivity, i.e., will only pivot when the vehicle experiences rapid deceleration or an abrupt stop. Of course, other types of adjustable mounting means may be utilized. For example, the support arm 15 could include multiple apertures or slots along the length thereof through which a pin is insertable for fastening the child seat 16 at varying horizontal and/or vertical positions.

Figure 1E:
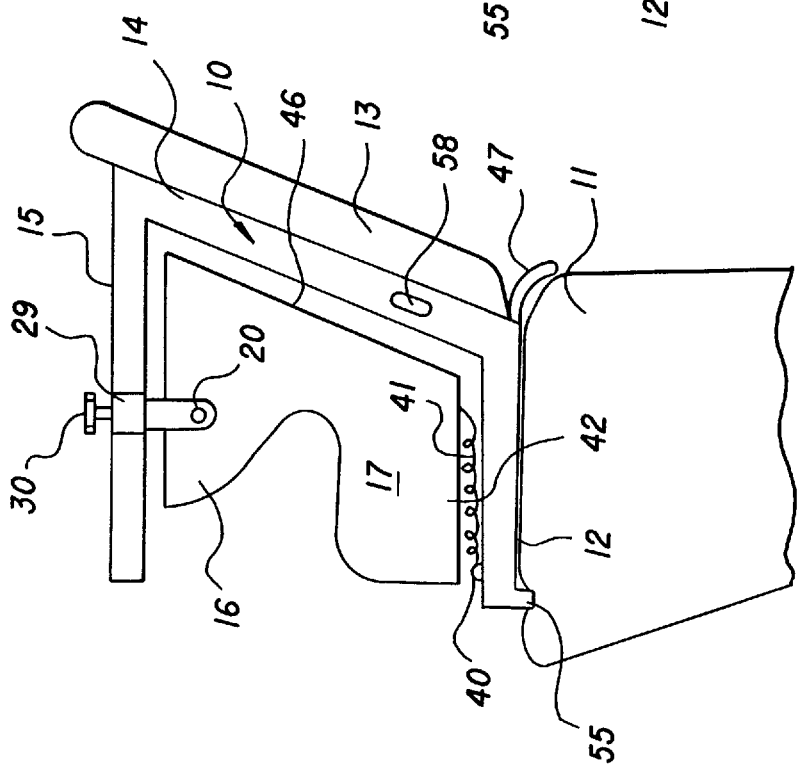

In the embodiment shown in FIG. 1e, the child seat 16 is shown mounted on a frame 10 having two support arms 15 as shown in FIG. 7. The clamps 29 include apertures 32 through which pins 20 are inserted and secured to side walls 17, 18 of the child seat 16. In this configuration, the child seat 16 is pivotable in a front to back direction, i.e., front being the direction in which a child occupant is facing.

Figure 3:
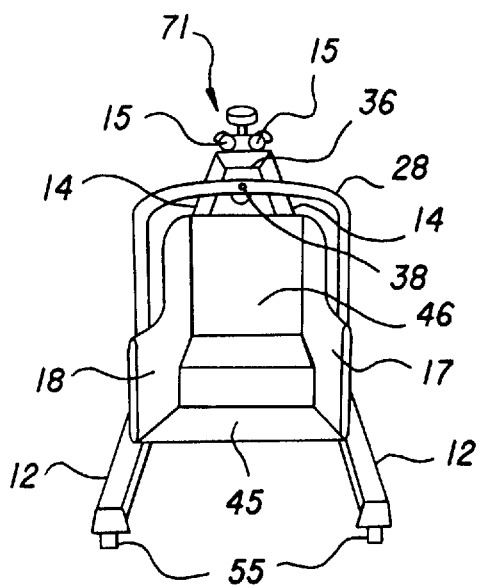
FIG. 3 is a front view of a configuration for mounting a child seat on the frame of the child vehicle in which child seat is movable transversely over a full 360° range.
Figure 9D:
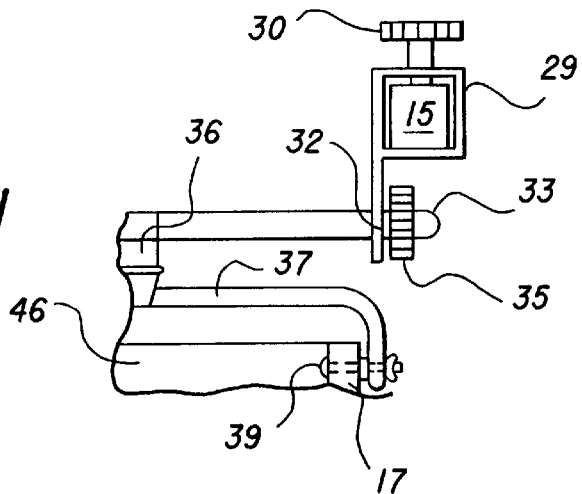

The child seat 16 may also be mounted so as to pivot from side to side (i.e., a direction perpendicular to the front to back direction) as well as from front to back, as shown in FIG. 1f, to help reduce injury due to side impacts or sharp turns. A hinge 36 may also be attached at one end to a bar 33 (FIG. 9d), opposite ends of which are inserted through apertures 32 and attached at the other end to the extension arm 28, or to a separate bar 37 which, in turn, is secured to sidewalls 17, 18 via screw threads 34 and locked in place in the apertures 32 by tightening with nuts 35 (FIGS. 1f and 9d). As an alternative to this configuration, a hinge 36 may be attached directly to the support arm 15 without the need for rod 33 shown in FIG. 3. In this embodiment, hinge 36 is mounted to extension arm 28 via a pivot pin 38, which allows pivoting of the child seat 16 from side to side. If rod 37 is utilized, it should be fixed to side walls 17, 18 of the child seat 16 via a screw 39 or the like, such that the child seat 16 does not pivot about the screw 39 (FIG. 9d).

Figure 9E:
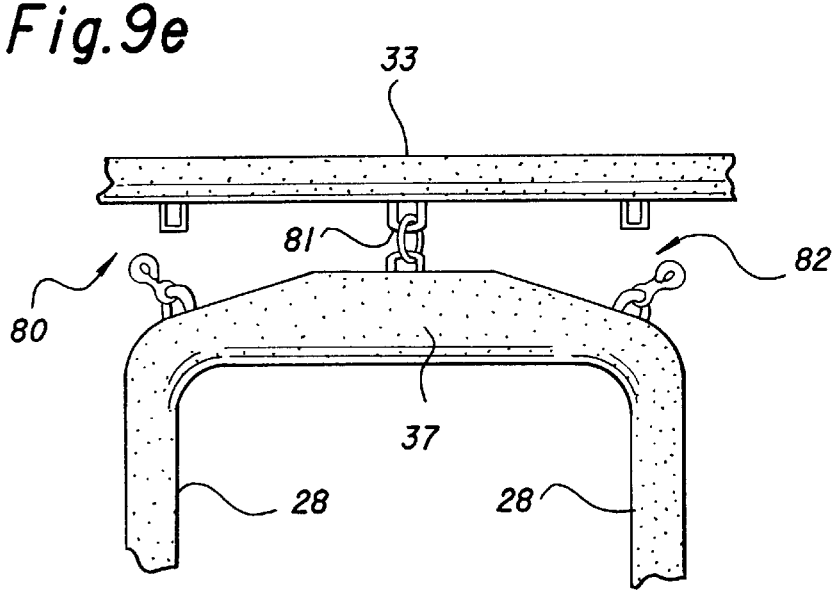

Hinge 36 in combination with pivot pin 38 allows transverse movement of child seat 16 across a full 360° range, where hinge 36 and pivot pin 38 form the center of a circle across which the child seat 16 swings, with the child remaining essentially in a forward-seated direction. FIGS. 9a and b show alternatives to the hinge 36/pin 38 combination for attachment of child seat 16 to the frame 10 to allow transverse movement over a full 360° range. In FIG. 9a, a first eyelet 72 is attached to clamp/securing screw 70. A second eyelet 73' is attached to bar 37 and engages first eyelet 72. In FIG. 9b, two U-bolts 73, 74 are used to attach a child seat, which is secured to bar 37, to rod 33. As shown, U-bolt 74 includes a quick-release mechanism 75, biased closed by a spring. Other similar configurations may, of course, be utilized to provide the desired full 360° transverse movement. Moveover, as shown in FIG. 9e, it is possible to utilize more than one attachment mechanism 80, 81, 82 to provide either front to back movement when all three attachment mechanisms 80, 81, 82 are secured, or transverse movement across a full 360° range when only attachment mechanism 81 is secured, as shown. In addition, the attachment mechanism may allow for attachment of the child seat such that the child is facing the side of the vehicle, rather than the front.

In order to prevent the child seat 16 from pivoting too far in either the front to back, side to side or transverse directions therebetween, the frame 10 may include a tie-down loop 40 or the like to which the child seat 16 is secured via a cord 41, preferably constructed from an elastic material (FIGS. 1e and f). Child seat 16 should, however, be allowed a sufficient degree of forward rotation such that an airbag deployed from the front dashboard of the vehicle will strike the base 42 of the child seat 16 as it pivots forward upon impact to, or rapid deceleration of, the vehicle.

The child seat 16 may also include a bar 43 which extends around the front portion of the child seat so as to rest in front of the child's face as shown in FIG. 2b. Preferably the bar 43 is guided in tubes 44 positioned in side walls 17, 18 to allow rapid insertion and removal of bar 43, which is frictionally held in tubes 44. Bar 43 provides additional protection by deflecting an airbag away from the child's head upon deployment to prevent injury caused by the airbag striking the child's head.

The child seat 16 of the invention may have any number of configurations. Further, it may be constructed of any suitable material and include a cushion (not shown) in the interior. Typically, the child seat 16 shown in FIGS. 2a and c is best suited for an infant. Toddlers may prefer the configuration shown in FIGS. 2b and d, as it allows them to rest their feet on a small footrest portion 45. The back 46 of the child seat 16 is preferably rounded as shown in FIGS. 2a–d to better conform to a vehicle seat. However, the back 46 may be flat.

Frame 10 is preferably secured to the vehicle seat by a projection extending rearwardly from the base portion 12 as shown in FIGS. 1a–d and 4a. In the embodiments shown in FIGS. 1a–d, the projection 47 is in the form of a curved bar which curves upwardly to engage the backrest 13 of the vehicle seat. Projection 47 may also be removed and reversed to engage the seat cushion 11 as shown in FIGS. 1e and f. One or more projections may be utilized as shown in FIG. 4.

Figure 4B:
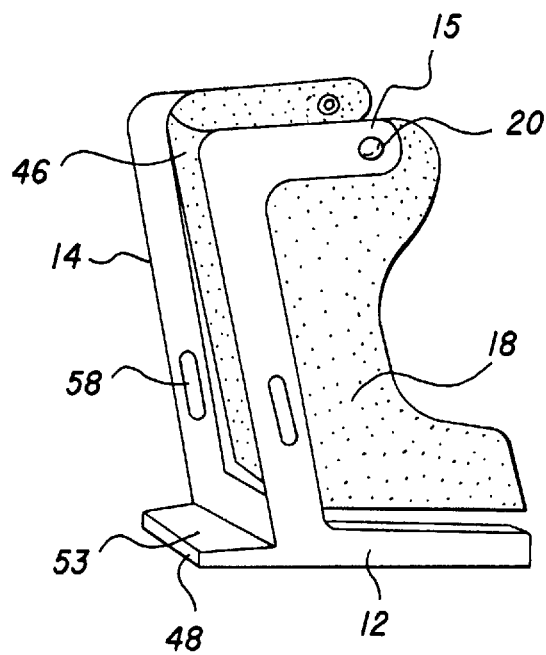
FIG. 4b shows a fixed projection for attaching the frame in place on a vehicle seat and for balancing the child vehicle safety seat when removed from the vehicle and placed on a flat surface.
Figure 4A:
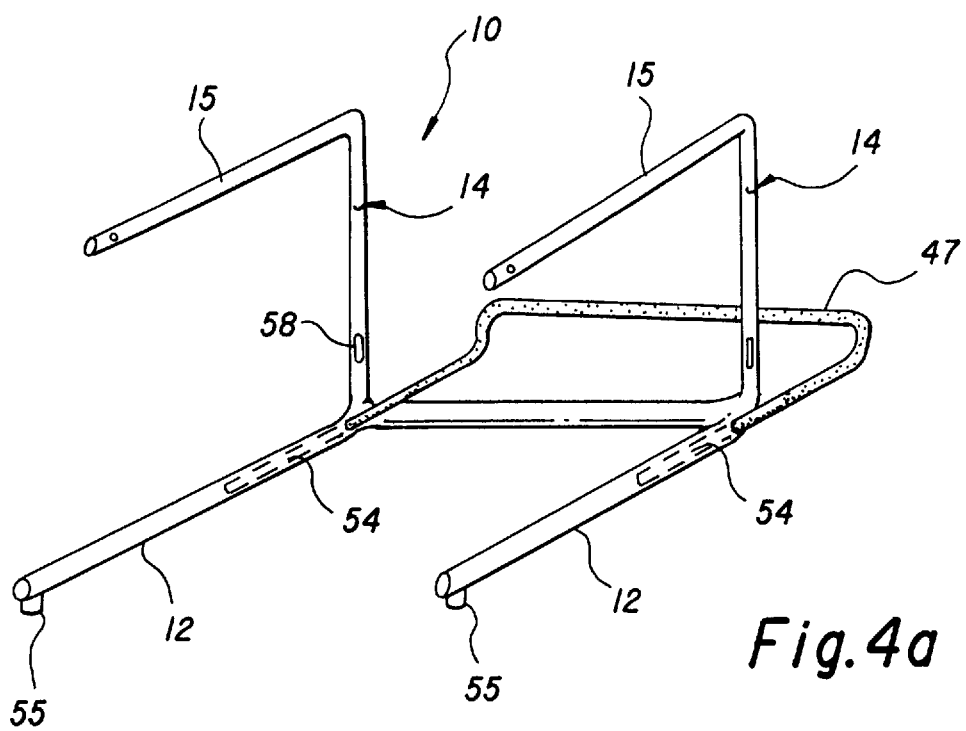
FIG. 4a shows a reversible projection for attaching the frame of the child vehicle safety seat in place on vehicle seat.

As shown in FIG. 4a, projection 47 may be adjustable in length by pulling it out of, or pushing it into, bores 54 in the base portion 12 of the frame 10. Small footings 55 located at the front of the base portion 12 and/or at the back of the base portion 12 (not shown) sink into seat surface and also help to stabilize frame 10 on the seat cushion 11 of the vehicle.

FIG. 4b shows a projection in the form of a flat board 53. Board 53 may also be slightly thicker at end 48 to provide a slight gripping force on the seat cushion or backrest of the vehicle seat. The child seat 16 may similarly include a projection (not shown) extending outwardly from the back 46 to allow the child seat 16 to be secured to the vehicle seat without using frame 10.

Alternatively, or in addition to the projection extending outward from the base portion 12, one or more hooks 56 may extend rearwardly from the upright portion 14 to engage the backrest 13 of the vehicle seat as shown in FIG. 1c. Hooks 56 may be movable longitudinally (as shown) with respect to the upright portion 14 through movement in a bore 57 in the upright portion 14, as well as movable radially. With regard to both hooks 56 and projections 53, the frame 10 may include any conventional means of locking them in place in their appropriate positions within bores 57, 54, respectively.

Figure 7A:
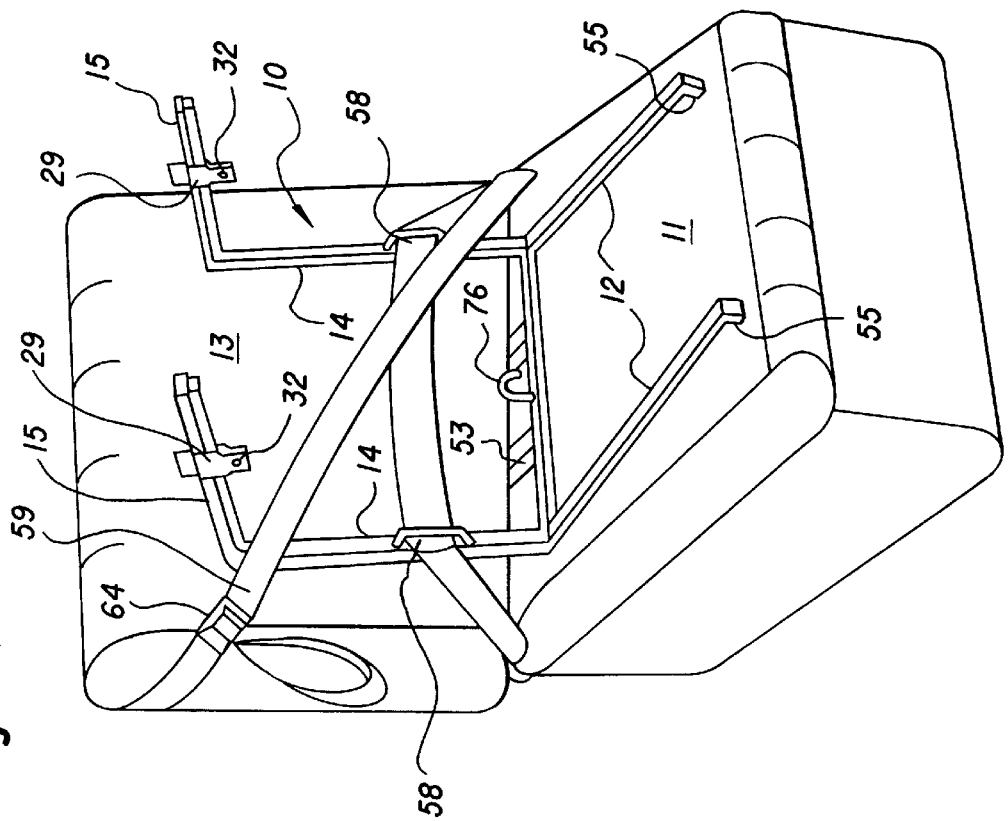
FIG. 7a is a front perspective view of the frame secured to a vehicle seat.
Figure 7B:
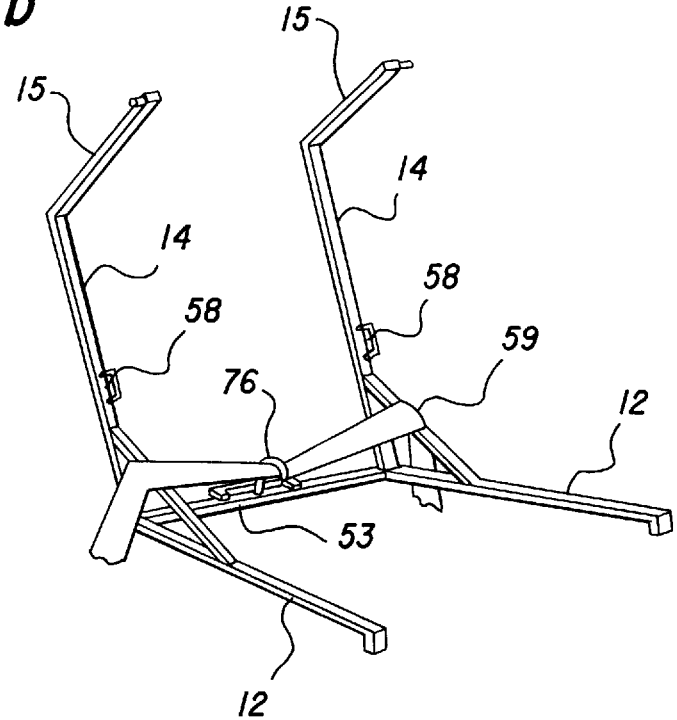
FIG. 7b is a front perspective view of the frame showing both an alternative configuration for securing the frame to a vehicle seat and an alternative mechanism for eliminating slack in the vehicle seat belt.
Figure 8:
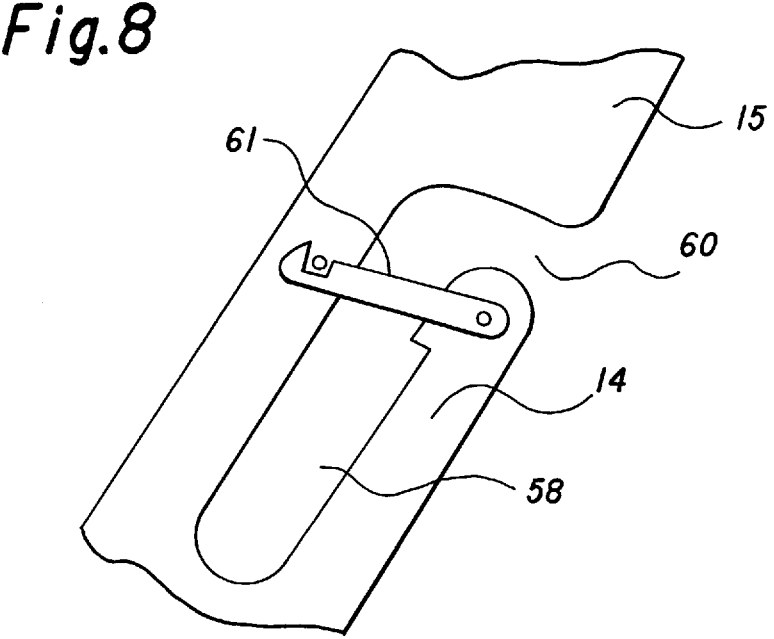
FIG. 8 is a side view of a seat belt retaining slot that allows for quick insertion and removal without having to thread a seat belt through tunnel-like slots.

In addition to utilizing hooks/projections for locking frame 10 in place on the vehicle seat, it is recommended that the vehicle seat belt be attached to the frame 10 to lock it in place on the vehicle seat as shown in FIGS. 7a and b. In this regard, the frame 10 may include apertures 58 for receiving a vehicle seat belt 59 or the seat belt 59 may simply pass over the frame 10 as shown in FIG. 7b. For ease of insertion, it is desirable that the apertures 58 include an open gap 60 through which the vehicle seat belt 59 is easily threaded into the aperture 58 as shown in FIG. 1b and in greater detail in FIG. 8. To prevent the seat belt 59 from sliding out of the aperture 58, gap 60 may be closed via a catch 61. Preferably, catch 61 is spring biased into the closed position as shown.

Figure 5:
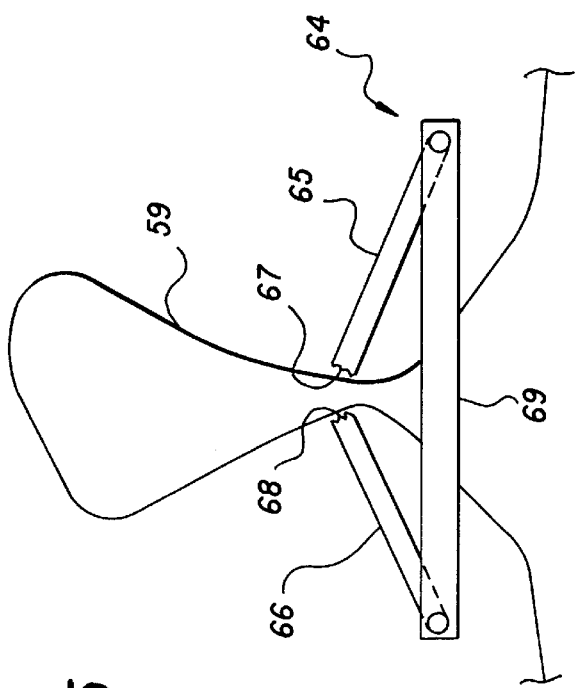
FIG. 5 is a side view of a locking mechanism for eliminating lack in the vehicle seat belt.
Figure 6:
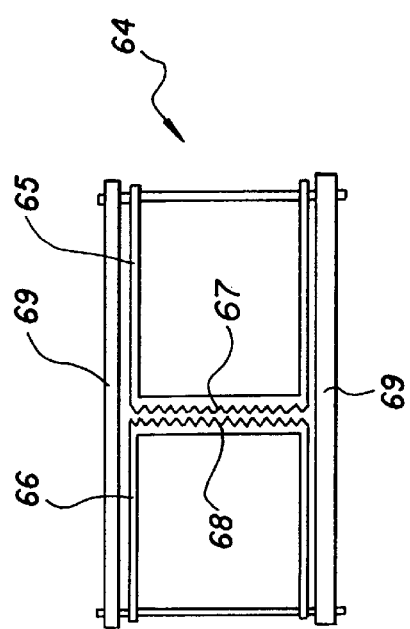
FIG. 6 is a top view of a locking mechanism shown in FIG. 5.

Since the majority of vehicle seat belts are designed to give slightly during normal driving so that the driver and passengers can lean forward, it is desirable that the child vehicle safety seat of the present invention include means for eliminating the slack in the vehicle seat belt 59 to thereby hold the frame 10 securely in place at all times. One such means of removing slack in the vehicle seat belt 59, especially in the diagonal component, i.e., that portion which extends across the passenger's torso, is by a locking device 64. As shown in FIGS. 5 and 6, locking device 64 includes two hinged members 65, 66 with corresponding locking teeth 67, 68 and connected by connecting bars 69. Hinged members 65, 66 are normally biased by a spring to lie in the same plane as the connecting bars 69 and may be rotated outwardly against the force of the spring action as shown in FIG. 5 for insertion of the vehicle seat belt 59. If an attempt is made to pull seat belt 59 in the opposite direction, the locking teeth 67, 68 lock onto the seat belt 59 and prevent it from being pulled out of the locking device 64 and allowing the frame 10 to loosen from the vehicle seat. Alternatively, locking device 64 may include only a single hinged member through which the seat belt 59 is inserted, the other member being fixed.

Even more preferably, seat belt slack is removed by using a hook 76, as shown in FIG. 7b under which the horizontal component, i.e., the lap strap, of the attached seat belt is hooked after the seat belt 59 has been locked in place as securely as possible. The mechanical advantage of this configuration is that the seat belt may be securely tightened with minimal application of force on the part of the person placing the belt under the hook 76. In addition to, or as an alternative to hook 76, other means of tightening the seat belt can be employed, such as tie downs, belts, velcro tapes and clamps.

Preferably, the child vehicle safety seat of the invention is designed so that upon removal from the vehicle seat, the frame 10 may be placed on the floor or other flat surface and the child seat 16 utilized as a swing. In this regard, the child vehicle safety seat may be equipped with a motor to create a continuous swinging/rocking movement of the child seat 16.

Although the invention has been described in considerable detail with respect to preferred embodiments thereof, variations and modifications will be apparent to those skilled in the art without departing from the spirit and scope of the invention as set forth in the claims.

I claim:

1. A child vehicle safety seat for use in a vehicle comprising:

a frame comprising a base portion positionable on a seat cushion of a vehicle seat, an upright portion for resting against a backrest of a vehicle seat, and at least one support arm extending outwardly at an angle from said upright portion;

means for securing said frame to a vehicle seat;

a child seat comprising a back portion having a top end, a bottom end, and opposite side walls, said child seat having a seat portion adjacent said bottom end; the height of said child seat being equal to a distance between said top and bottom ends; and means for mounting said child seat on said support arm such that said child seat hands freely therefrom when secured to said vehicle seat and such that said child seat freely pivots with respect to a fixed point on said support arm, said fixed point being located at a distance from said upright portion, and substantially at or above the top end of the back portion of the child seat at a position substantially the same height greater than the height of the child seat while the frame is in an upright position and there are no horizontal forces acting on said child seat.

2. The child vehicle safety seat according to claim 1 wherein said child seat includes at least one aperture in each side wall of said child seat, and said mounting means includes securing pins received in said apertures and means for connecting said securing pins to said at least one support arm.

3. The child vehicle safety seat according to claim 2 wherein each of said apertures comprises an elongated slot, said securing pins being fastenable at different locations along said slots for adjusting an angle of said child seat with respect to the frame.

4. The child vehicle safety seat according to claim 2 wherein each of said side walls includes multiple apertures for receiving said securing pins whereby an angle of said child seat with respect to the frame is adjustable.

5. The child vehicle safety seat according to claim 1 wherein said mounting means comprises a clamp slidably fastened to said at least one support arm at varying positions along a length thereof.

6. The child vehicle safety seat according to claim 1 wherein said mounting means includes a first pivot allowing movement of said child seat in a forward and backward direction with respect to a front and back of said child seat.

7. The child vehicle safety seat according to claim 6 wherein said mounting means further includes a second pivot connected to said first pivot for allowing movement of said child seat in a direction perpendicular to the direction of movement allowed by said first pivot, the combination of said first and second pivots allowing movement across a full 360° range.

8. The child vehicle safety seat according to claim 1 wherein said securing means comprises a projection extending rearwardly from a lower end of said frame and insertable between a backrest and a seat cushion of a vehicle seat.

9. The child vehicle safety seat according to claim 8 wherein a length of said projection is adjustable.

10. The child vehicle safety seat according to claim 1 wherein said child seat further includes a removable safety bar attachable to opposite side walls of said child seat and extending across a front of said child seat.

11. The child vehicle safety seat according to claim 1 further comprising means for connecting a vehicle seat belt to said frame.

12. The child vehicle safety seat according to claim 11 said connecting means comprises at least one slot in said frame including a latch openable for receiving and removing the seat belt and closeable for securing said frame against the vehicle seat.

13. The child vehicle safety seat according to claim 1 further comprising means for removing slack in a vehicle seat belt.

14. The child vehicle safety seat according to claim 1 further comprising means for limiting degree of pivot of said child seat.

* * * * *